United States Patent [19]

Leonard et al.

[11] 4,033,525
[45] July 5, 1977

[54] FEEDBACK PDM ENCODER AND METHOD FOR ACTUATING A PNEUMATIC ACTUATOR WITH A DIGITAL AUTOPILOT

[75] Inventors: John P. Leonard; Robert E. Yates, both of Huntsville, Ala.

[73] Assignee: The United States of America as represented by the Secretary of the Army, Washington, D.C.

[22] Filed: Dec. 8, 1975

[21] Appl. No.: 638,476

[52] U.S. Cl. .................... 244/3.15; 244/3.21; 318/580; 318/603; 91/47; 235/150.2
[51] Int. Cl.² ............................................ F42B 13/30
[58] Field of Search ......... 318/603, 580, 599, 615; 91/47; 244/76 A, 78, 175, 3.15, 3.21; 235/150.2

[56] References Cited

UNITED STATES PATENTS

| 3,415,466 | 12/1968 | Poole, Jr. ........................ 244/3.21 |
| 3,430,536 | 4/1969 | Oelrich ............................ 91/47 |
| 3,437,894 | 4/1969 | Pohl ............................... 318/603 |
| 3,521,535 | 7/1970 | Oelrich ............................ 91/47 |
| 3,826,964 | 7/1974 | Byrne ............................. 318/603 |
| 3,940,673 | 2/1976 | Darlington ...................... 235/150.2 |

*Primary Examiner*—Verlin R. Pendegrass
*Attorney, Agent, or Firm*—Nathan Edelberg; Robert P. Gibson; Freddie M. Bush

[57] ABSTRACT

A feedback PDM encoder and method is presented which permits utilization of pneumatic pulse duration modulation (PDM) actuators with potentiometer position pickoffs in a digital autopilot loop. The actuator is directly driven by a signal derived in the digital autopilot which is in the pulse duration modulation (PDM) format. This signal is derived within the autopilot digital computer using conventional digital techniques. Analog feedback from the potentiometer which indicates angular excursion of the actuator is formatted into a PDM format. This method yields all signals necessary to operate the actuator in a closed loop missile control system.

4 Claims, 4 Drawing Figures

4,033,525

FEEDBACK PDM ENCODER AND METHOD FOR ACTUATING A PNEUMATIC ACTUATOR WITH A DIGITAL AUTOPILOT

DEDICATORY CLAUSE

The invention described herein may be manufactured, used, and licensed by or for the Government for governmental purposes without the payment to us of any royalties thereon.

BACKGROUND OF THE INVENTION

Pneumatic PDM actuators are extensively employed in guided missile guidance and control systems. They are designed to be driven by analog amplifiers which combine the output of a saw tooth oscillator with analog position command and analog position feedback signals. Utilization of such devices with digital autopilots has required that the position feedback transducer of the actuator be replaced by a digital encoder and that the position command signal be converted from the digital output of the computer to an analog signal. Both of these techniques are very costly and require precision electronic circuitry and angular measurement devices.

SUMMARY OF THE INVENTION

The apparatus and method for employing a pulse duration modulation (PDM) pneumatic actuator with a digital autopilot provides for operation of a pneumatic vane by directly driving the actuator from the autopilot with a PDM output. Actuator position feedback is formatted into digital form and combined with actuator command signals in the digital computer to form an actuator solenoid input signal in PDM form.

DESCRIPTION OF THE PREFERRED EMBODIMENT

Figure 1:
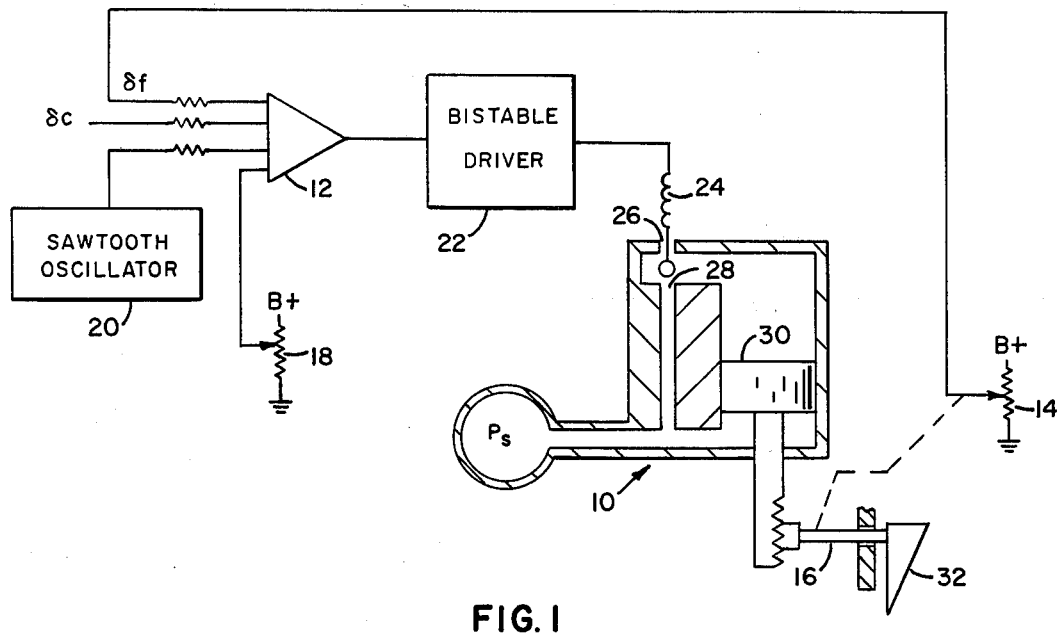
FIG. 1 is a diagram of a PDM pneumatic vane actuator and associated analog autopilot circuits as conventionally employed in the prior art with extraneous parts omitted.

FIG. 1 discloses a prior art PDM pneumatic actuator 10 as employed in a conventional analog autopilot. An analog position command signal, $\delta_c$, is summed in an operational amplifier 12 with an analog feedback signal, $\delta_f$, derived from a potentiometer 14 on the actuator shaft 16. A null adjustment potentiometer signal from null potentiometer 18 and a saw tooth reference signal derived from an oscillator 20 with preset amplitude and frequency are also summed with these signals in amplifier 12. The output of amplifier 12 is a saw tooth signal biased about the sum of the analog input signals from the feedback potentiometers. This signal is fed to a bistable driver circuit 22 which alternately drives solenoid 24 to block either one of two orifices 26 and 28 within the pneumatic actuator 10 which mechanically drives shaft 16 and attached vane 32. Actuator 10 is shown in simplicity to show the bidirectional piston movement. Since the saw tooth oscillator frequency is typically fixed at frequencies on the order of 100 to 150 cycles per second and the actuator pneumatic time constants are long with respect to the periods of such oscillations the net response of the actuator is accurately approximated by taking the actuator fluid flow during changes to be proportional to the algebraic sum of the analog inputs to amplifier 12. Linear displacement of the actuator piston 30 and resulting deflection of vane 32 is proportional to the integral of the fluid flow. This and similar prior art systems are conventional and extensively employed within the art.

The feedback PDM encoder of the instant invention develops essential signals utilized in the prior art and required for vane control by a unique analog to digital conversion. These PDM encoder signals are coupled to the digital autopilot. The output of the digital autopilot is then directly introduced into the solenoid driver circuit for controlling the vane position.

Figure 2:
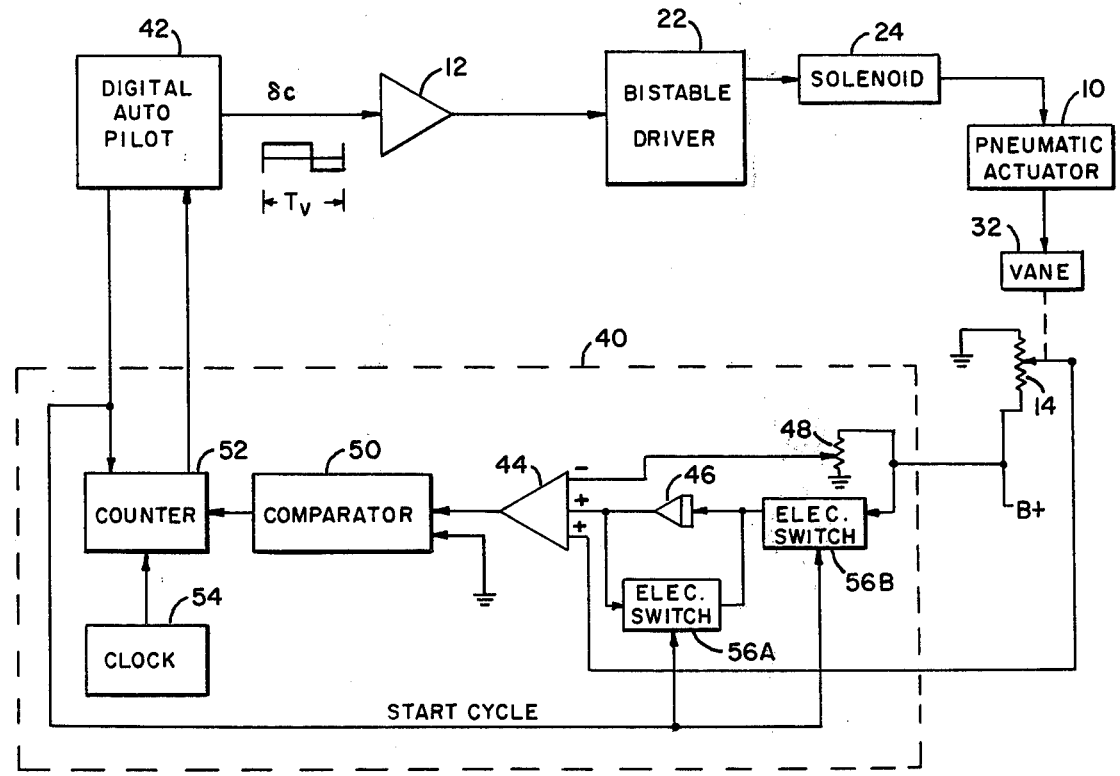
FIG. 2 is a block diagram of a preferred embodiment of the feedback PDM encoder of the instant invention.

Referring now to FIG. 2, the feedback PDM encoder is shown in conjunction with the related prior art components for providing actuator control. The buffer amplifier 12, relay driver 22, solenoid 24, pneumatic actuator 10, and the feedback position potentiometer 14, are identical to those shown in FIG. 1 of the prior art and operate in the same manner.

However to provide pneumatic actuator control from the autopilot a feedback PDM encoder 40 is coupled to receive the potential variation present across potentiometer 14. The output of encoder 40 is coupled directly to digital autopilot 42. The output of encoder 40 indicates the angular position of the actuator shaft rotation as sensed by potentiometer 14. The output is in digital form and returned to the autopilot comparator to uniquely indicate the shaft and related vane position.

Encoder 40 comprises a summing amplifier 44, integrator 46, null adjustment 48, comparator 50, counter 52, and clock 54. A positive input of summing amplifier 44 is coupled to the variable arm of potentiomer 14. Integrator 46 has an output coupled to another summing input of amplifier 44. The output of integrator 46 may also be coupled through an electronic switch 56A back to the integrator input. An electronic switch 56B is coupled between the integrator 46 input and a common connection between potentiometers 14 and 48 and B+. The other side of the potentiometers are coupled to system ground. Switch 56A is normally closed and switch 56B is normally open when the system is inactive. This state changes when the encoder start cycle is intiated. The start cycle is initiated when an output signal from the digital computer within digital autopilot 42 gates counter 52 and activates switches 56. Clock 54 initiates timing within the counter when the counter is activated. Output signals from summing circuit 44 are coupled to comparator 50 and the output of comparator 50 is coupled to counter 52. The variable arm of potentiometer 48 is coupled as a negative input to summer 44 and allows the system to be nulled initially for a zero balance.

In operation, the digital autopilot 42 generates a start cycle command which initializes counter 52 and switches 56. Counter 52 starts counting the output pulses of clock 54. Electronic switches 56 enable integrator 46. Summing circuit 44 is driven by the difference of its null adjustment and the sum of the integrator output and a voltage proportional to the actuator shaft position. The output of summer 44 is fed into comparator 50. When the input comparator voltage signal reaches a predetermined reference level, the comparator generates a stop command to counter 52. The counter output register now contains a digital word which is proportional to the actuator shaft position with respect to an established zero reference or null position. The output from counter 52 couples this value to the autopilot. The digital autopilot accepts the value of the counter output register and disables the start cycle signal, resetting the integrator. The autopilot then can directly compare the actual vane position as coupled from the encoder with the desired position held within the autopilot.

Figure 3:
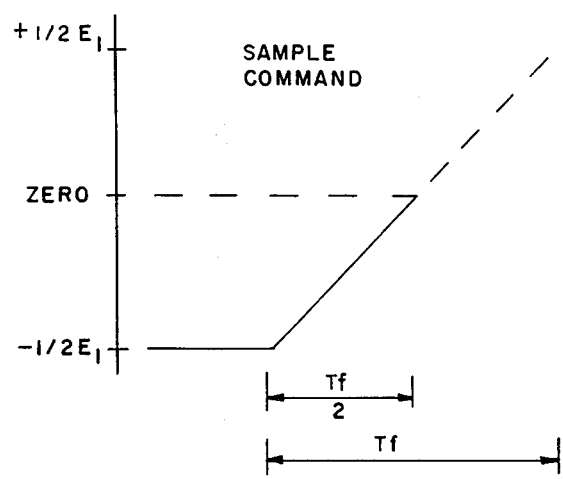
FIG. 3 shows the output waveform of the summing circuit of FIG. 2.

The integrator 46 output will linearly change from zero to a voltage $-E_1$ in an interval of time $T_f$ after closure of the contacts of switch 56B. If this were the only signal fed into summer 44, its output would be the negative of this ramp, a linear increase from zero to a voltage $+E_1$. However, the additional signals from potentiometers 14 and 48 allow this voltage reference to be shifted such that zero voltage occurs for a center vane position as shown in FIG. 3. Thus, the output signal of summer 44 is a ramp voltage which starts with a negative value and rises towards zero and positive values at a fixed rate. The time delay between the start cycle command input to counter 52 and the stop pulse delivered back to the counter is a direct meansure of vane deflection and polarity which is readily usable in the digital autopilot computer. This ramp signal exceeds zero at a time ½ $T_f$ after the start cycle command driving the output of comparator 50 to provide the stop command. This stop command is a positive going pulse coupled to counter 52. Thus the interval counter is enabled for the period $T_{f/2}$ for $\delta = 0$ (no vane deflection).

Figure 4:
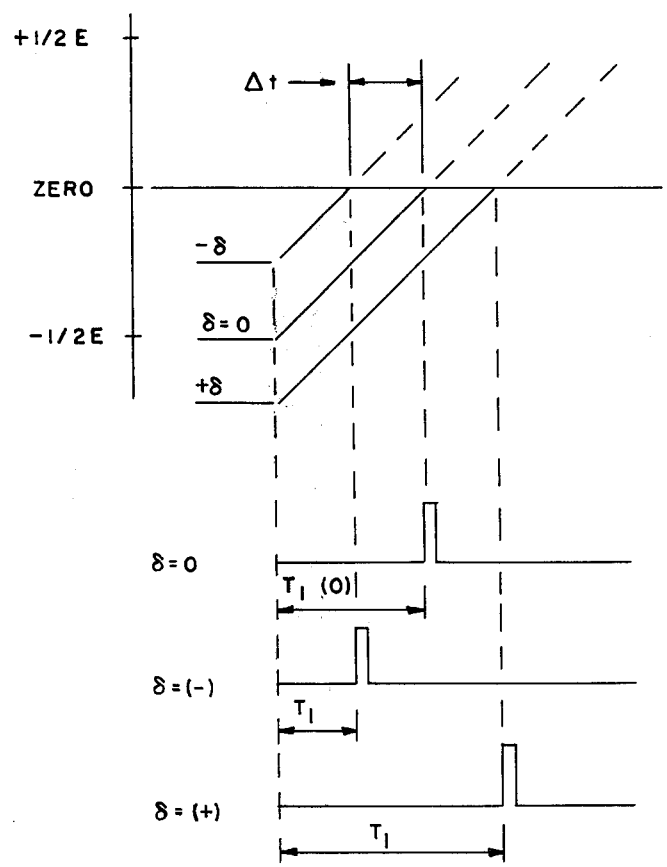
FIG. 4 shows the output waveforms of the summing circuit of FIG. 2 and of the comparator circuit for positive and negative values of vane deflection.

FIG. 4 illustrates the effect of vane positions $\delta$ other than zero on the outputs of summer 44 and at the input of integrator 46. It can be seen that the existence of a vane position which is negative with respect to the null condition ($-\delta$) shortens the time T between the start cycle and stop, while a positive vane position $+\delta$, increases the time T. It is well established that T, the time interval from start cycle to stop, is given by the equation $$T = \frac{\delta}{2 \delta \max} + \frac{1}{2} T_f,$$

where
 $\delta$ is vane rotation from center position
 2 $\delta$ max is the total possible travel of the vane potentiometer from the largest negative $\delta$ to the largest positive $\delta$.
 $T_f$ is the preselected sample time which corresponds to maximum positive $\delta$
 The degree of command $\delta_c$ the autopilot to the buffer amplifier 12 is determined by comparing the autopilot's desired actuator shaft rotation with the actual position as determined by the potentiometer 14 and as provided by the digital signal output of the counter. The digital autopilot then generates an enable command $\epsilon_c$ of the correct time to cause the correct PDM response of the actuator's duty cycle. A periodic check of the encoder 40 output by the autopilot allows the autopilot to compare and correct the actuator and vane position for flight control.

The pneumatic actuator torquing period in dependent upon the internal characteristics of the actuator design is is typically 6 to 10 milliseconds. The sampling interval, $T_f$ of the equation is chosen such that one sampling interval falls within each actuator torquing period, $T_v$, but $T_f$ may be much shorter than $T_v$. In general, the speeds of digital processors are such that a set of four actuators and feedback systems can be readily operated in either a serial or parallel format by a signal ditital autopilot.

The simplicity of the feedback PDM encoder is such that an individual circuit can be dedicated to each actuator element and physically mounted on the actuator. Since the potentiometer adjustment is provided in this circuit, this arrangement permits the actuator null to be adjusted independent of the digital autopilot, a great convenience in integrating missile system elements.

Although a particular embodiment and form of this invention has been illustrated, it is apparent that various modifications and embodiments of the invention may be made by those skilled in the art without departing from the scope and spirit of the foregoing disclosure. Accordingly, the scope of the invention should be limited only by the claims appended hereto.

What we claim:

1. In a guidance control system having a digital autopilot coupled to control a pneumatic PDM actuator and related missile vanes, the improvement comprising: a feedback PDM encoder; a position indicating potentiometer disposed along the vane positioning shaft of said actuator for coupling a potential change relative to said shaft position as an input to said encoder; a cycling input to said encoder from said digital autopilot for activating said encoder to receive and process input signals from said potentiometer; a digital output from said encoder to said digital autopilot for indicating the actuator position; and said feedback PDM encoder comprising an integrator having an input and an output; a comparator having an input and an output; a summing amplifier having a plurality of inputs and an output, said summing amplifier output being coupled as said comparator input, a first input of said plural inputs being coupled to said indicating potentiometer, and a second of said plural inputs being coupled to said integrator output; a counter coupled to the output of said comparator for coupling an output pulse to said digital computer; and the input of said integrator is coupled to said indicating potentiometer.

2. In a guidance control system the improvement as set forth in claim 1 wherein said encoder further comprises a null adjustment potentiometer having the variable arm coupled as a third and final input of said plural summing amplifier inputs, the fixed arms of said adjustment potentiometer being connected in parallel with said indicating potentiometer; switching means coupled between said indicating potentiometer and said integrator for activating and deactivating said integrator.

3. In a guidance control system the improvement as set forth in claim 2 wherein said encoder further comprises a clock having an output coupled to said counter, and said switching means encoder cycling input being coupled to said counter for gating said counter and said switching means.

4. In a missile guidance and control system, the method of controlling a pneumatic PMD actuator with a digital autopilot comprising the steps of:

coupling a digital enabling signal to said actuator from said autopilot for a predetermined interval for changing the actuator shaft position to correspond to a predetermined internal autopilot reference signal;

activating counting means after said predetermined interval;

integrating a variable potential representative of actuator position;

comparing the time interval of said actuator position signal with a zero reference level to provide a zero crossing output pulse;

disabling said counter with said zero crossing output pulse;

gating said autopilot with an output signal from said counter which indicates the time delay between said counting means activating command and the counting means disabling pulse which is a direct measure of actuator deflection and polarity for corresponding to said predetermined internal reference signal.

* * * * *